United States Patent
Porcelli et al.

(10) Patent No.: US 6,333,924 B1
(45) Date of Patent: Dec. 25, 2001

(54) HIGH LATITUDE GEOSTATIONARY SATELLITE SYSTEM

(75) Inventors: Giacomo Porcelli, Gaithersburg, MD (US); Kenneth F. Manning, McLean, VA (US)

(73) Assignee: USCX, Washington, DC (US)

( * ) Notice: Subject to any disclaimer, the term of this patent is extended or adjusted under 35 U.S.C. 154(b) by 0 days.

(21) Appl. No.: 09/423,089
(22) PCT Filed: May 1, 1998
(86) PCT No.: PCT/US98/08587
§ 371 Date: Feb. 11, 2000
§ 102(e) Date: Feb. 11, 2000
(87) PCT Pub. No.: WO98/51022
PCT Pub. Date: Nov. 12, 1998

Related U.S. Application Data

(60) Provisional application No. 60/045,506, filed on May 2, 1997.

(51) Int. Cl.⁷ .............................. H04Q 7/00; H04B 7/19; H04B 7/185
(52) U.S. Cl. .................... 370/331; 342/356; 342/357.06; 342/357.12; 455/13.1; 455/436
(58) Field of Search .................................... 370/331–534; 342/352–356, 357.01–357.17, 364, 365, 366–368; 455/12.1, 13.1, 13.2, 436–444, 427, 430

(56) References Cited

U.S. PATENT DOCUMENTS

| | | | | |
|---|---|---|---|---|
| 4,502,051 | * | 2/1985 | Dondl | 342/356 |
| 4,854,527 | * | 8/1989 | Draim | 244/158 R |
| 4,943,808 | * | 7/1990 | Dulck et al. | 342/356 |
| 5,506,781 | * | 4/1996 | Cummiskey et al. | 701/226 |
| 5,561,838 | * | 10/1996 | Chandos et al. | 455/13.1 |

* cited by examiner

Primary Examiner—Wellington Chin
Assistant Examiner—Steven Nguyen
(74) Attorney, Agent, or Firm—Sughrue Mion, PLLC

(57) ABSTRACT

A satellite broadcast and communication system employing a constellation of satellites in highly elliptical and highly inclined orbits, where the satellites remain almost stationary relative to ground users, describing a small loop in the sky around the apogee of the orbit for long periods of time. A user on the ground with conventional directive antenna will be provided with continuous communication services without interruption, 24 hours per day. The small loop where the satellites are operational is located around the highest latitude of the orbit. Therefore, it will have a high angular separation from satellites operating in the equational geostationary satellite orbit (hereafter more simply referred to as the geostationary satellite orbit), thus enabling a full sharing of the frequency hands used by the geostationary satellite orbit systems, without causing any interference between the two types of satellite network systems, and without the need for any interference migrating factors. The users of this orbit are able to see a completely seamless transmission service from satellite without the need of switching between satellites, or service interruptions.

29 Claims, 15 Drawing Sheets

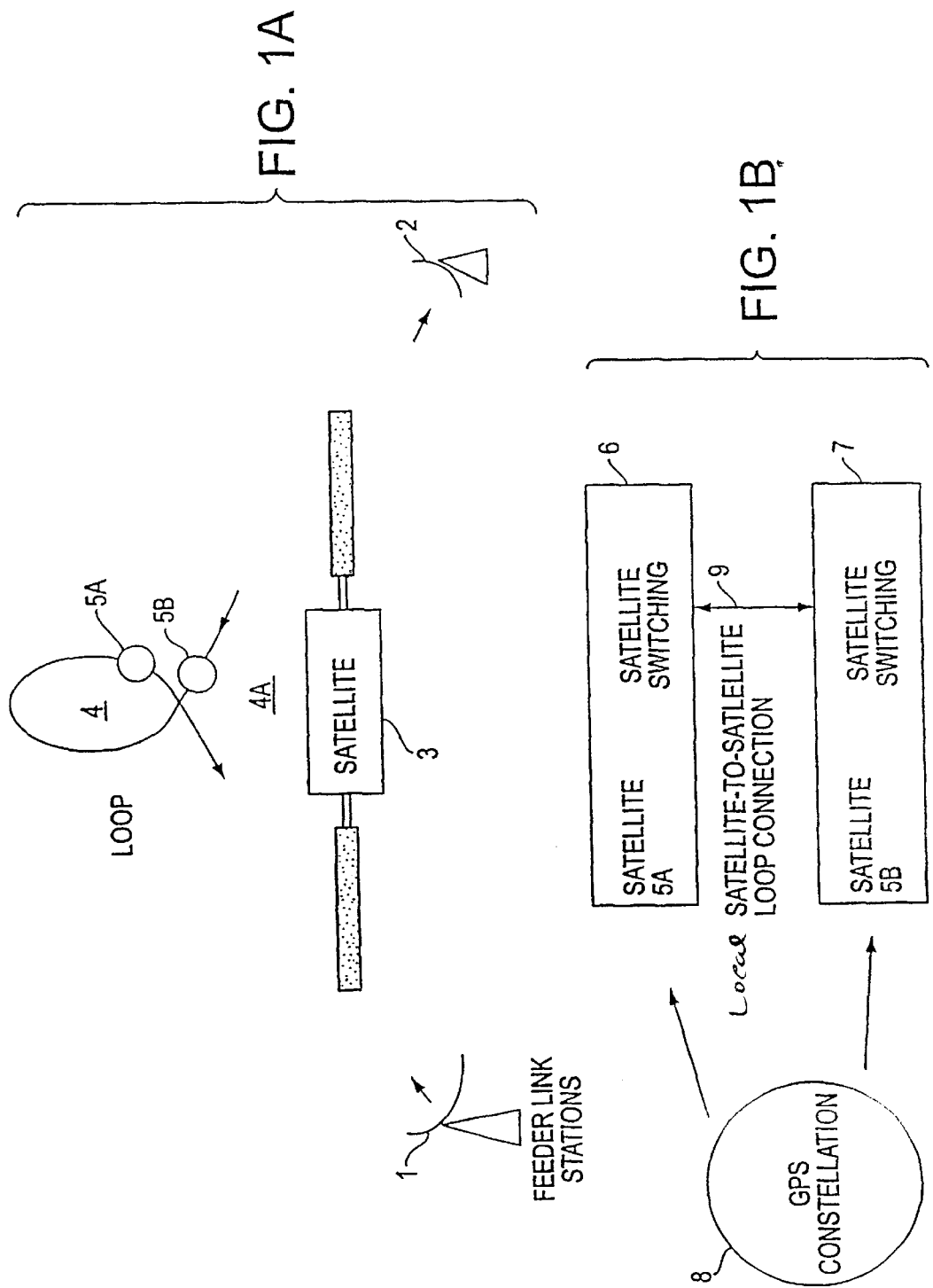

HIGH LATITUDE GEOSTATIONARY SATELLITE SYSTEM

This application claims domestic priority from U.S. Provisional Application Ser. No. 60/045,506, filed May 2, 1997, and the entire content of that application is incorporated herein by reference.

BACKGROUND OF THE INVENTION

There is an increasing demand for the provision of fixed point-to-point, or point-to-multi-point satellite communications services. The use of the orbital frequency spectrum that meets the needs for satellite communication services has increased significantly, resulting in scarcity or unavailability of geostationary orbital slots, or satellite positions, for certain prime frequency bands, and orbit locations. The frequency spectrum used by satellites in the geostationary satellite orbit is finite and its reuse by those satellites is limited by the level of interference incurred between the different satellite systems in that orbit sharing the frequency bands. With this present level of increasing congestion (both spectrum and orbital), a need exists to establish alternative systems, where satellites have essentially the same user characteristics as satellites in the geostationary satellite orbit, in that the satellites remain almost stationary relatively to the ground, and provide, without any ground intervention, continuous service to the users.

An object of the present invention is to provide such an alternative. The orbit of this invention allows the spectrum used by satellites in the geostationary satellite orbit to be completely reused by satellites of this invention without causing any interference. Communication ground stations operating with satellites of this invention will be the same as the ground stations operating with satellites in the geostationary satellite orbit. The only difference is that, by virtue of an angular separation of 45 degrees or more between satellites of this invention and the geostationary satellites, as seen from any ground location, the ground terminal of the systems of this invention will be pointed to a different place in the sky.

Another object of the present invention is to place each satellite in an orbit that appears almost stationary relatively to a fixed point on the earth during an operational portion of the orbit, along which the satellite defines to a ground-based user a small loop, hence its characterization as "geostationary". In fact, to a ground-based observer, at a single longitudinal location, a pair of loops are defined, one being a minor loop at the highest latitude with its apogee extending to 63.4 degrees, and the other being a major loop, the pair of loops being disposed on one side of the equator. Since the operational portion of the orbit (the minor loop) is located at high latitudes (above 45 degrees N. or S. and at or below 63.4 degrees N. or S., respectively), this invention is defined as a High Latitude Geostationary Satellite System. A distinction that needs to be made between satellites operating in the orbits of this invention and more popular "Geostationary Satellites" is that satellites of this invention are geostationary during a part of their orbit, namely their operational part, whereas the popular geostationary satellites are located in a 24 hour orbit which is geostationary, and therefore the satellites are stationary for 24 hours per day.

Another object of the present invention is to achieve a switching of active communications between satellites by use of precise timing signals from the Global Positioning System (GPS) and the use of inter-satellite links between the satellites in order to ensure that a seamless transition of communication services is provided to users on the ground without the need of any ground control intervention.

SUMMARY OF THE INVENTION

The present invention comprises a satellite system, related apparatus and methods of operation for the provision of satellite broadcast and communications services, in the same manner as presently provided to users of the geostationary satellite orbit while allowing complete frequency reuse of the radio frequency spectrum that is used by satellites in the geostationary satellite orbit providing similar services. Although the existing satellite systems and the present invention use the same frequency bands, no interference is experienced and no mitigating factors are required by either system to avoid interference.

The satellites related to the present invention are placed in a constellation of either 3 or 4 satellites in highly elliptical orbits at an operational altitude ranging from ⁻30,000 to ⁻40,000 km. A constellation of such satellites can be implemented to serve either the northern hemisphere or the southern hemisphere. In each hemisphere, two regions of coverage are obtained separated from each other by 180 degrees in longitude. The satellites are in a nearly 12 hour orbit. With a 3-satellite constellation, two satellites are simultaneously operating, each one of them over one of the two coverage regions, while the third satellite transitions between the coverage regions. In a 4-satellite constellation, two satellites are simultaneously operating, each one over one of the two coverage regions, while the other two satellites transition between coverage regions. In the case of the 3-satellite constellation, each satellite spends 8 hours of service on each of the two coverage regions every 24 hours. In the case of the 4-satellite constellation, each satellite spends 6 hours of service on each of the two coverage regions every 24 hours. During the operational phase, each satellite serving its designated region appears approximately fixed relatively to a user on the ground. When the operating satellite is about to be replaced by the next satellite entering the same region, both satellites, which are providing identical coverage, remain co-located for a period of time. This period is adequate to permit hand-over with no service interruption to the ground network, using highly directional antennas having narrow beams and being operational without the need for a dynamic pointing capability, or at most pointing in a single plane.

This seamless hand-over is accomplished between the two satellites independently of any ground control network operating with the satellites and uses the precise timing obtained from the Global Positioning System (GPS) to ensure that transmissions terminating on one satellite are synchronized with the transmissions commencing on the new satellite for any ground stations in the coverage region. The use of GPS may be supplemented with the use of real-time timing, but not control, signals from earth stations.

The orbits of satellites used in connection with this invention are such that coverage can be provided to selected geographical areas, where population density is high and demand for these types of satellite services exists. Primarily, these highly populated areas occur in the northern hemisphere and to a certain extent in the southern hemisphere, but generally not around the equator. The satellites of this invention, operating along small geostationary loops at a high latitude in either the northern or southern hemisphere, can therefore provide service to users in heavily populated areas, with the benefits of high elevation angles of view to the satellites, as compared with low elevation angles with which satellites in the geostationary satellite orbit can service the same areas. Therefore, the present invention results in the capability of extending service to many high-latitude users who would otherwise receive poor service, or no service at all, for their inability to advantageously use the equatorial geostationary satellites, as a result of their lower elevation angles and consequent effects of terrain blockage and atmospheric attenuation. High elevation angles at high latitudes, as provided by satellites of this invention, are also advantageous in areas subject to rain fading.

The total number of satellites for each constellation is either 3 or 4. The weight and therefore the launch costs of these satellites are considerably less than those of the corresponding equatorial geostationary satellites. For equal capability communication satellite payloads, two satellites of this invention could be launched on the same launch vehicle that would only be capable of handling one equatorial geostationary satellite. Recognizing that a minimum of three satellites are required to cover two regions compared with an equatorial geostationary satellite system that would require two (plus two spares), the economics may be in favor of satellites of this invention.

A further feature of the invention is the use of satellites having 3-axis stabilized mechanisms and single gimbaled solar arrays, further comprising a despun antenna or antenna platform that is used to remove the rotation of the satellite antenna about the target point in order to avoid rotation of the beam during the operational period while said satellite is in the minor loop.

The present invention provides the opportunity for a major expansion of the scarce radio frequency spectrum resource used for commercial satellites, without any impact on the way present communication services are provided to users from the geostationary satellite orbit.

BRIEF DESCRIPTION OF THE DRAWINGS

FIG. 1A is a schematic illustrating the satellite system of this invention.

FIG. 1B is a schematic illustrating the inter-satellite link and GPS satellite system communications of this invention.

DETAILED DESCRIPTION OF THE PREFERRED EMBODIMENTS

Figure 1C:
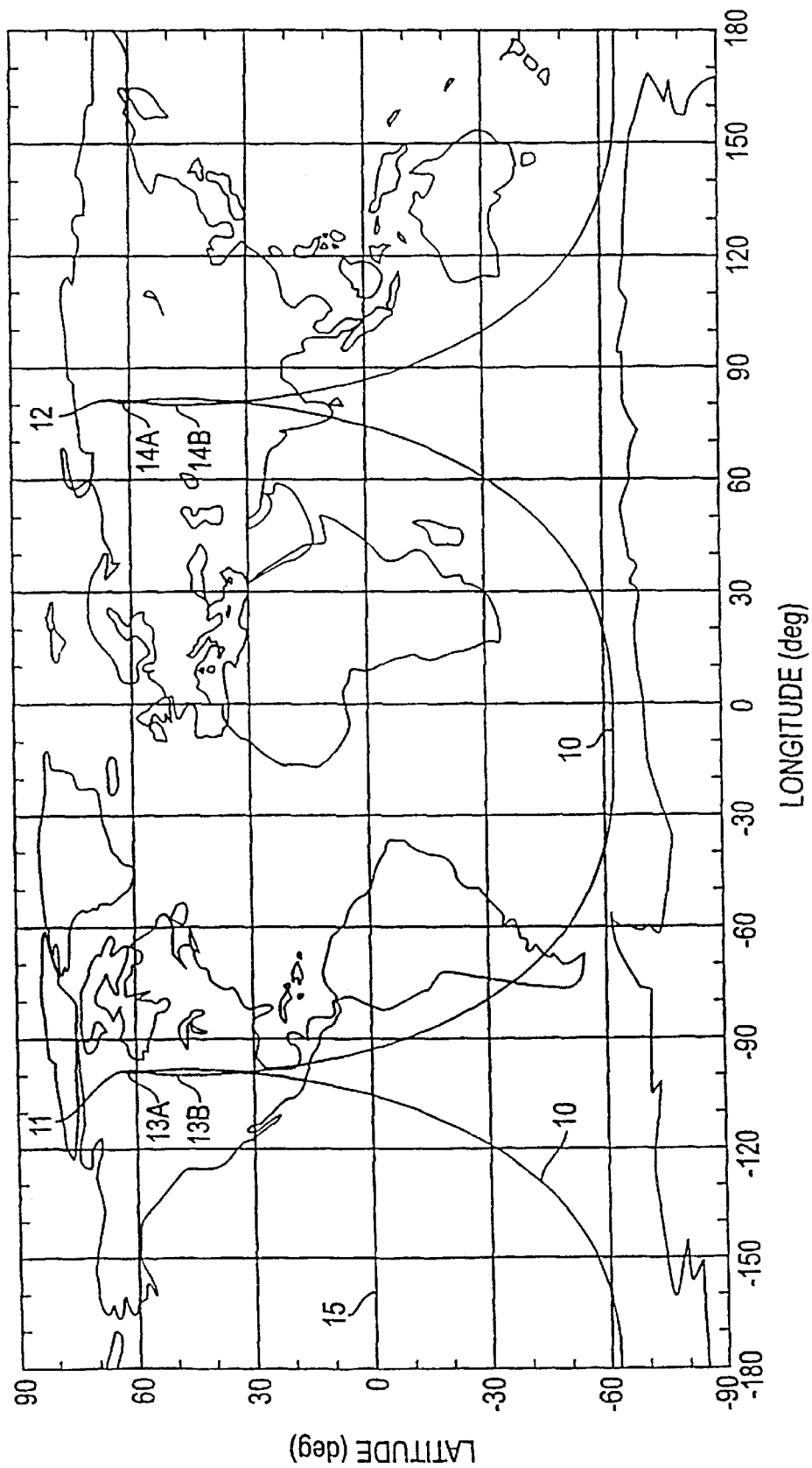
FIG. 1C illustrates the ground track of each satellite (three or four) in the constellation, and the two loops at each location with only the small loops (at the highest latitude) being the operational point of the satellite.

As shown in the drawings, this invention is a satellite-based communication system employing a constellation of satellites in orbits which allow each satellite to appear to traverse a pair of loops, one minor and one major, at a predetermined longitude and between latitudes on one side of the equator, and to appear approximately stationary to users on the ground as it traverses the minor loop so that a seamless operation with no interruption in the communications transmission services can be provided when one satellite takes over from the other. The parameters of the orbits for each satellite are selected to minimize the minor loop size and to permit the hand-over of communications from one satellite leaving the minor loop to the satellite entering the loop, while the two are co-located for a period of time adequate to allow switching of the transmission services between them, without any interruption of high capacity communication services to users on the ground.

FIG. 1A illustrates a satellite system in accordance with the present invention. The system includes a constellation of communication satellites, which may include broadcast satellites, in orbits in which they appear approximately stationary to the user on the ground and share the same frequency spectrum as the satellites in the geostationary orbit. The constellation consists of either three (3) or four (4) satellites placed in highly inclined, highly eccentric orbits, with the orbital period approximately equal to 12 hours. The satellite components and orbital parameters are chosen to meet the following objectives:

1. Provide a seamless transmission hand-over between the operating satellite and its replacement, without any intervention from the ground.

2. Minimize the longitudinal and latitudinal dimensions of the operational loop.

3. Provide broadcast satellite services to fixed, highly directional receiving antennas on the ground.

4. Provide regional coverage in two longitudinally opposite areas of the northern or southern hemisphere.

5. Minimize the number of satellites in the constellation.

6. Eliminate any possibility of interference with any element of the equatorial geostationary communication satellite systems (either on the ground or in space).

7. Minimize the energy (propellant) required to maintain the orbit.

8. Maintain the operational satellite in continuous sunlight, avoiding any solar eclipse and thus removing the requirement for heavy batteries to operate the communication subsystems during eclipse periods, as required in equatorial geostationary satellites.

9. Minimize satellite costs and lower launch weights for satellites used with the present invention, compared with equatorial geostationary satellites.

With reference to FIG. 1A, which is a schematic illustration of the components in a high latitude geostationary satellite system in accordance with the present invention, a transmission to the satellite 3 occurs from the feeder link stations 1 situated in each region of the satellite coverage to the receive stations 2 contained within the satellite transmit coverage area. The operational satellite 3 is in an orbit 4A that appears from the ground within each satellite coverage region to be a pair of connected loops having a figure-8 appearance, with communications between the ground and the satellite 3 being at a time that the satellite is located in the minor loop 4 located at the apogee of the orbit and remains in this loop for 6 hours (4 satellite constellation) or 8 hours (3 satellite constellation). The pair of loops (one minor and one major) is disposed entirely on one side of the equator and a satellite in the minor loop will appear from the ground to remain geostationary at the latitude and longitude required to meet the system coverage.

An operational satellite 5A leaving the loop 4 becomes co-located with the next operational satellite entering the loop 5B and remains co-located with this satellite for at least three minutes (in the four satellite constellation) as regards range distance and satellite angular separation as seen from the ground stations. The range difference as seen from the ground stations, operating within the 20 degree or higher elevation angle contour to the satellite, consists of a total range variance of approximately 3000 meters or less. The range difference, properly controlled to avoid in-orbit collisions, requires a synchronized switching procedure between satellites 5A and 5B using on-board satellite switching equipment 6 and 7, respectively, as seen in FIG. 1B. Both satellites receive timing information directly from a constellation of satellites in a Global Positioning System (GPS) 8. Then, via a local satellite-to-satellite communication link 9, that may become operational as the satellites get closer, the two satellites automatically establish an accurate timing relationship between the two satellites. The link is established before the satellites become co-located and enables switching transmissions from the previous operational satellite to the new operational satellite to occur in a precise way. With the two methods proposed for satellite switching, no interruption of service will be incurred, irrespective of transmit or receive terminal location.

In order to maintain the loop and the satellite crossover point at the same geographical location, an optimum set of orbital elements has been developed for the three-satellite constellation and for the four-satellite constellation. They are:

| | |
|---|---|
| Semi-major axis (a): | 26450 km |
| Eccentricity (e): | 0.7237 |
| Inclination (i): | 63.43 degrees |
| Argument of perigee (ω): | 270 degrees (northern region coverage) |
| | 90 degrees (southern region coverage) |

Right Ascension of the Ascending Node (RAAN). Equally spaced around the Equator.

For the 3-satellite system, the only change in orbital elements is e=0.7137. The following describes the details of the four-satellite system. Differences with the three-satellite system are noted as appropriate.

The value chosen for the semi-major axis is such that the orbital period of revolution is approximately 12 hours (specifically 11 h, 53 min, and 30 sec), thus yielding a repetitive ground track in the presence of the orbit perturbations (luni-solar gravity, and Earth harmonics). An illustration of the ground track for the four-satellite system is given in FIG. 1C. The ground track is the ground trace of the line joining the instantaneous position of the satellite and the Earth center. The orbital inclination (63.43 degrees) is the value typically required to prevent a rotation of the apsidal line in the orbital plane (sometimes referred to as "orbit walk"). This ensures that the apogee of the orbit remains always at the operational latitude (north or south), thereby eliminating the need of periodic adjustments of the apsidal line.

The argument of perigee establishes the latitudinal location of the perigee, hence that of the apogee, north or south. As shown in FIG. 1C, the ground track 10 with these orbital parameters traces two pairs of loops 11, 12 at each of the longitudinal positions with only the smaller loop 13A, 14A around apogee (herein the "minor loop") being used as the "operational loop," i.e. that portion of the orbit along which satellite broadcasting is activated. Notably, the other loop 13B, 14B in each pair (herein the "major loop") is located at approximately the same longitude as the minor loop but is closer to but still on the same side of the equator 15. The two pairs of loops 11, 12 are located 180 degrees apart, and in the same hemisphere.

Figure 2A:
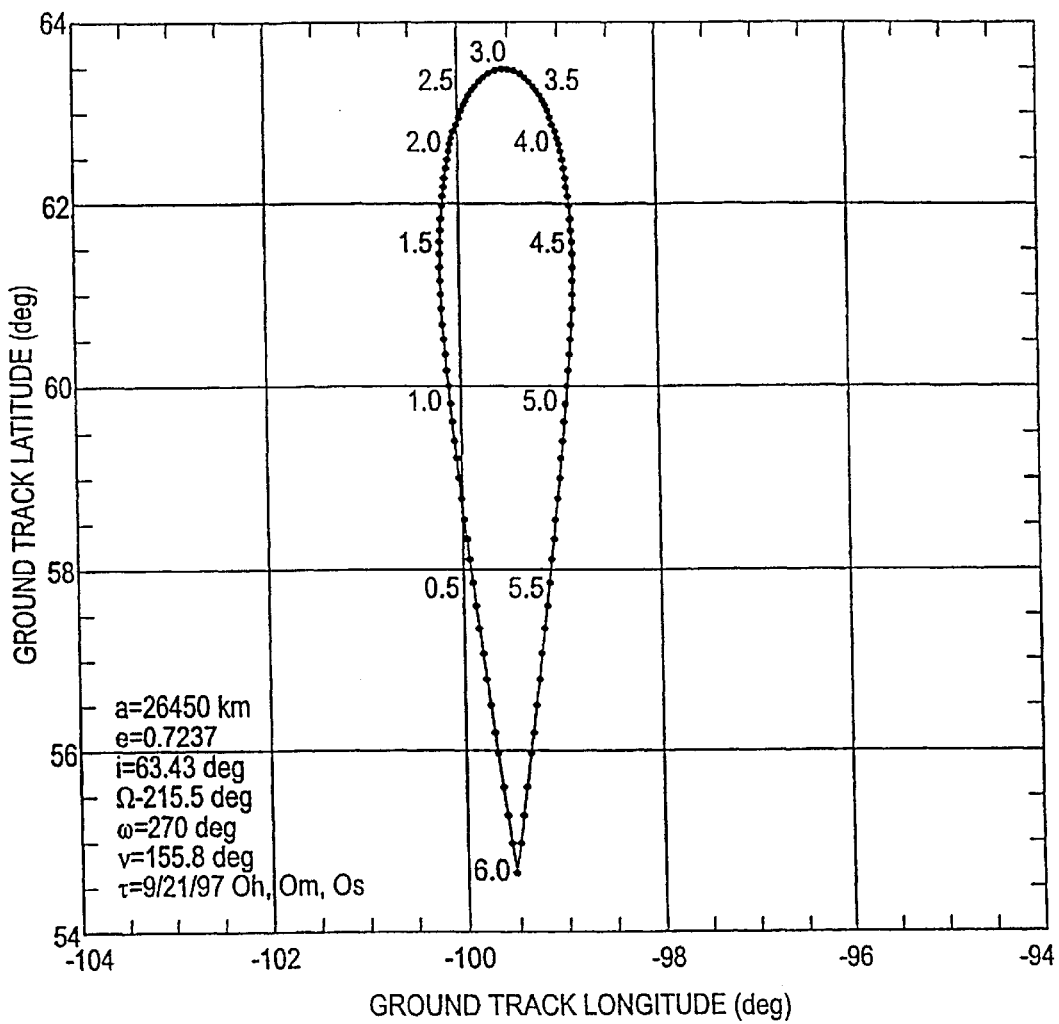
FIG. 2A illustrates the ground track of each satellite of the four-satellite system along the operational arc of the orbit.
Figure 2B:
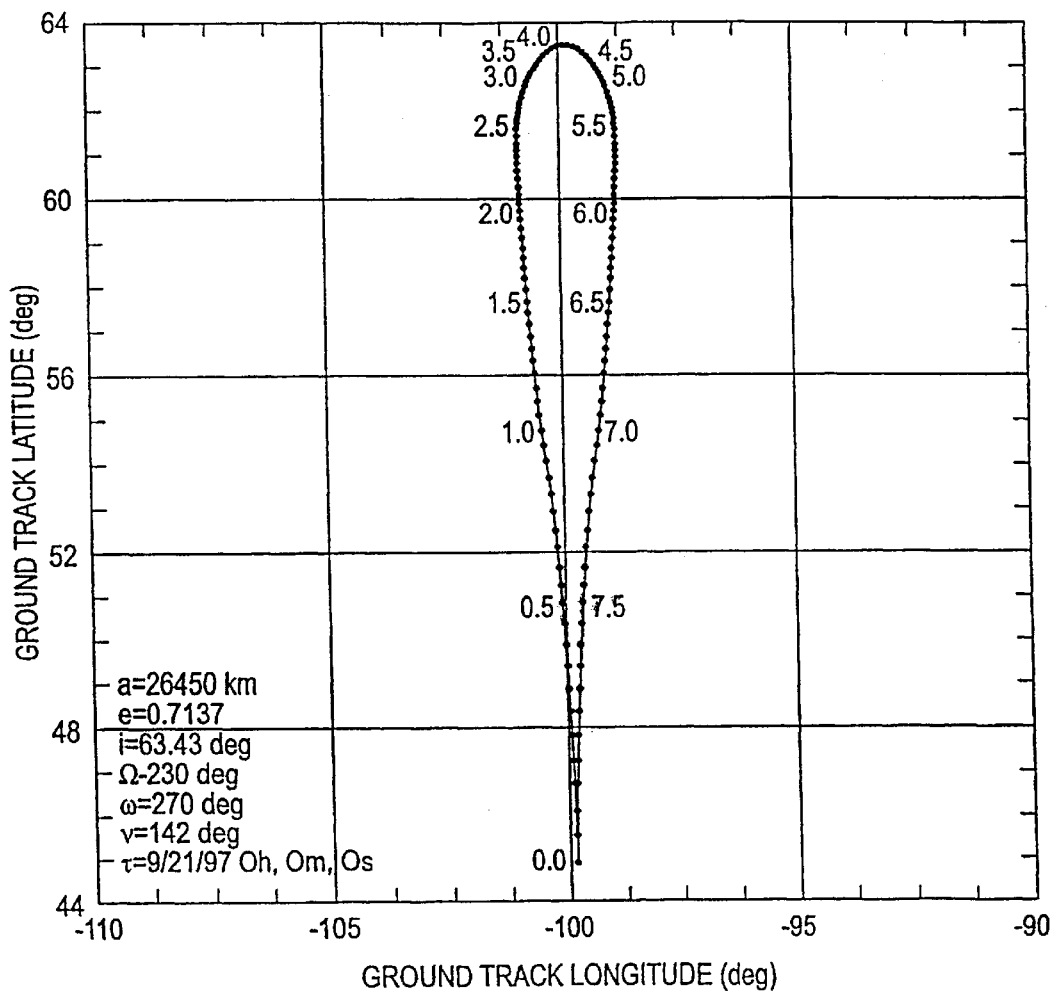
FIG. 2B illustrates the ground track of each satellite of the three-satellite system along the operational arc of the orbit.

One of the two criteria for the selection of eccentricity is to minimize the longitudinal and latitudinal excursions of the ground track in the operational arc (loop) of the orbit. This ensures that, while the satellite transits through the operational portion of the orbit, the satellite appears nearly stationary relatively to any ground location within the coverage area, thus allowing a fixed antenna terminal to receive communications from the satellite. An illustration of the ground track of the four-satellite system, along one of the two geostationary loops is shown in FIG. 2A. The figure is actually an enlarged plot of the small "operational loop" that appears in FIG. 1C at the highest latitude of the ground track on the North American continent. The latitude variation along this loop is a little less than 9 degrees. The longitude variation is less than 1.4 degrees. The figure is labeled with time, in units of ½ hours from the beginning to the end of the loop, and is dotted at 3-minute intervals. An identical loop appears at the opposite geographical longitude (same latitude) over Siberia, on the Asian continent. The loop ground track for the 3-satellite system is shown in FIG. 2B. The longitude/latitude excursions are nearly twice those of the 4-satellite system (e.g., 18.4 degrees; 2.02 degrees). It is when each one of the satellites of the constellation appears to trace the ground track along each one of these high latitude loops, and only within the boundary of these loops, that the satellite broadcast is activated. Due to larger excursions in the sky above the service area, for the 3-satellite system, minimal tracking mechanisms (single-axis) may be required for narrow-beam antennas. The other criterion on which eccentricity selection is based is to ensure that each satellite describes the loop (from beginning to end) in the number of hours allocated to its service over each service region. Thus, for the 4-satellite system, the loop hours are six (6), and for the 3-satellite system they are eight (8).

Due to the high eccentricity of the orbit, the satellite slows down significantly and gradually as it approaches apogee. It attains the minimum velocity at apogee, within the minor loop, and accelerates thereafter in a symmetrically reverse fashion. With the chosen set of orbital elements, the time spent by each satellite of the 4-satellite system going from the beginning to the end of each loop is exactly 6 hours. This permits it "phasing" the four satellites of the constellation in such a way that, as one satellite approaches the end of its transit along the "loop" (i.e. its departure from the loop), the next satellite is ready to take over its 6-hour portion of the service. Since the orbital period is ⁻6.5 min short of 12 hours, this allows a minimum of 3 minutes of overlap at each end of the loop, more than sufficient for the switching. In such a way, service can be provided with continuity to the respective coverage areas. Within each sidereal day (the time it takes the Earth to rotate exactly 360 degrees around its axis, which is approximately 23 hr, 56 min and 4 sec) each satellite of the constellation will have serviced each coverage area once. Similar considerations, with appropriate change in loop-hours, apply to the 3-satellite system.

It is important to understand how the switching from satellite to satellite provides continuity of service to the same coverage area. It is pointed out that, while the satellite orbits remain practically stationary in "inertial" space (except for the minimal effects of perturbations, which have been accounted for in the selection of the orbital elements), the Earth rotates continually around its axis. Therefore, in order for each satellite to enter the same "loop" of the ground track at the time that the previous satellite in service approaches "departure" from that loop, it is necessary that the planes of the satellite orbits be equally spaced around the globe. This imposes the requirement that the RAAN of the satellites be equally spaced in longitude.

Figure 3A:
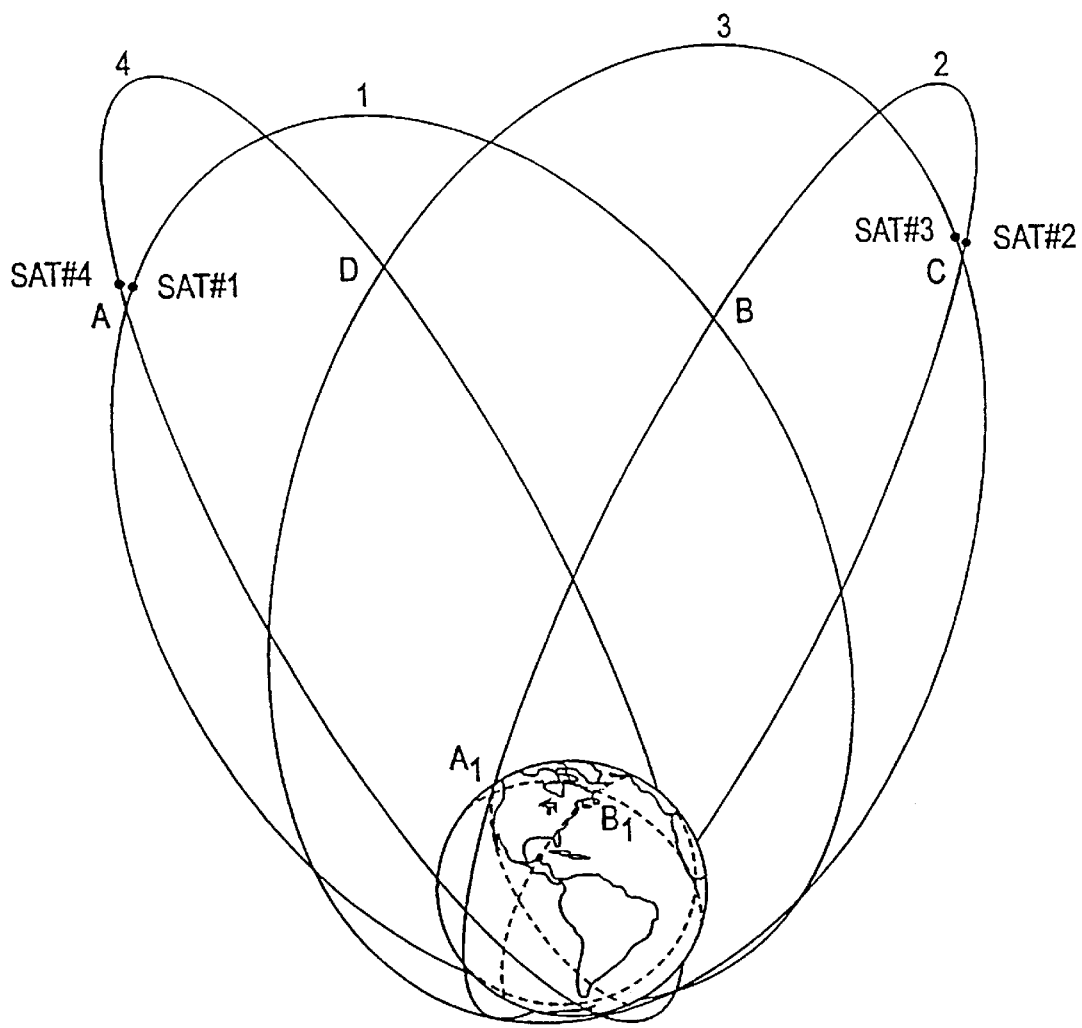
FIG. 3A illustrates a general orbital view of the four-satellite system, as seen from a point in space outside the orbit environment and at a latitude 5 degrees North.

An illustration of the 4-satellite constellation is shown in FIG. 3A. The figure actually shows a "picture" of the system at one instant of time, when the approximate center of the North American continent passes under the apogee of Orbit #1. The figure also shows, with dashed lines, the ground tracks of each orbit (three are visible in the figure, the fourth is too close to the visible horizon, thus blending with it). At high latitude, the orbits intersect each other at the points A, B, C, and D. Correspondingly, the ground tracks intersect each other at the points $A_1$ $B_1$, etc. (of these four ground track intersections, only two are visible in the figure, the others occur on the backside of the Earth). The operational arcs of Orbits #1 through #4 are respectively A-B, B-C, C-D, and D-A. The following is a description of the switching sequence.

As an example, assume that at a given time t (assume t=0 hr) the satellite in Orbit #4 (Satellite #4) is about to leave its operational arc D-A. The follow-on satellite in the sequence must be Satellite #1, which, at the same time, must be ready to enter its operational arc A-B. Thus, the two satellites (#4 and #1) must, at that time, be located close to point A. Since it takes 6 hours for Satellite #1 to move from A to B, and 6 more hours to go back around to A, and since this can likewise be repeated for each satellite in the constellation, it can be seen that, in order for Satellite #2 to meet Satellite #1 at the end B of the operational arc A-B, Satellite #2 must be close to point C at time t=0, on its way out of its operational arc B-C. Consequently (and similarly to the first two satellites), Satellite #3 must also be located close to point C at the same time, on its approach to its operational arc C-D. To summarize, in the instantaneous picture being considered, two satellites are close to A and the other two are close to C. Furthermore, since the orbital period is slightly less than 12 hours, and it takes exactly 6 hours for each satellite to transit along its operational arc, it can be deduced that, near the switching time, the satellite pairs #4-#1 and #2-#3 will be located at a latitude slightly higher than that of the intersection points (A and C in the example being described). This provides approximately 3.25-min overlap at the bottom of the respective loops. The satellite pairs #4-#1 and #2-#3 are also shown in the figure, although not in scale.

Figure 4A:
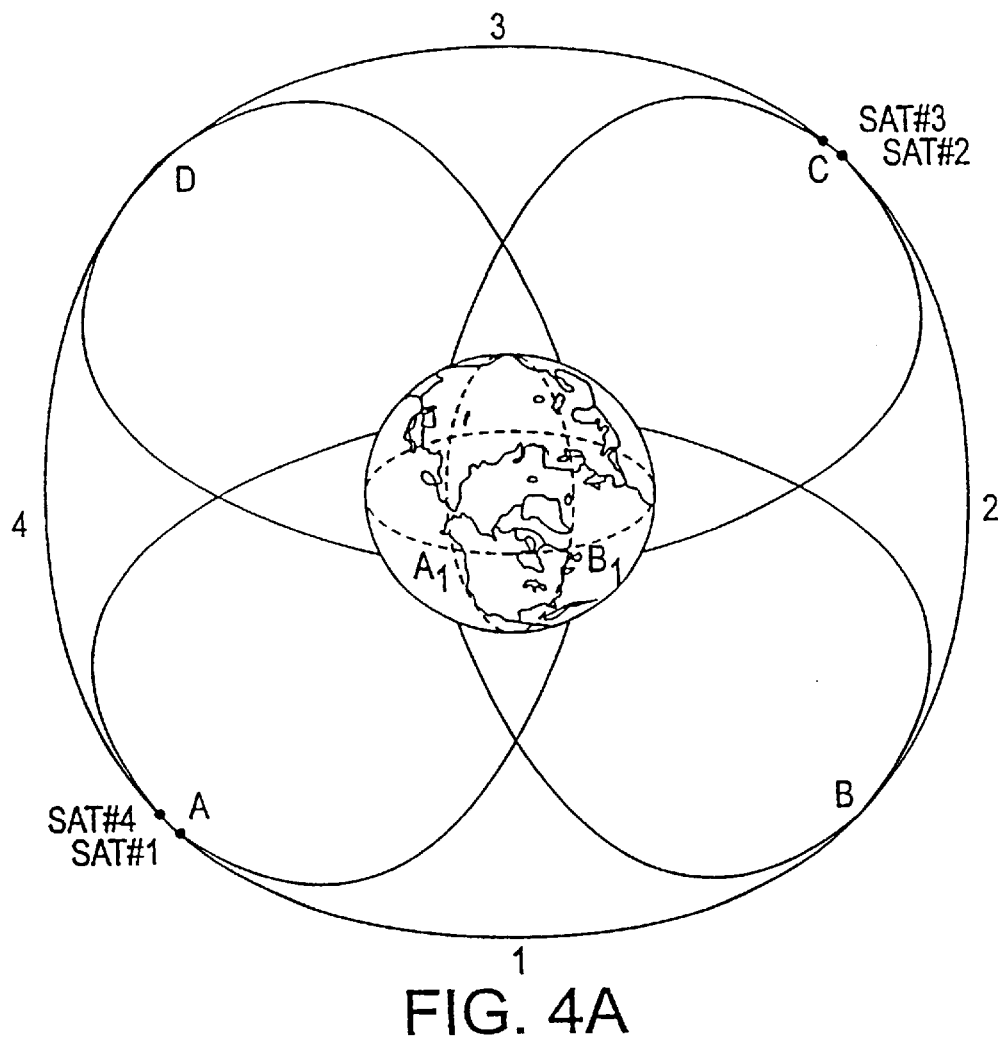
FIG. 4A shows a general orbital view of the four-satellite system, as seen from a point in space outside the orbit environment along the North side of the Earth axis.

As time evolves, each satellite follows its course, but only two at a time (in opposite orbits, say Orbit #1 and #3, or #2 and #4), are engaged in their operational phase. Thus, each satellite is operational 6 out of every consecutive 12-hour period, i.e. it has a duty cycle of 50%. The combined motion of each satellite in its orbit and of the Earth around its axis provides the apparent stationary position of each satellite along the loop described before, during the respective 6-hours service. Thus, during an entire sidereal day each service area will see the four satellites in sequence, with continuity. The cycle will then repeat itself. Another illustrative view of the system is shown in FIG. 4A. This figure more clearly illustrates the latitudinal excursion (shown in detail in FIG. 2A) of each satellite along its operational arc. Again, the position of the satellites as shown in the figure is not to scale.

Figure 3B:
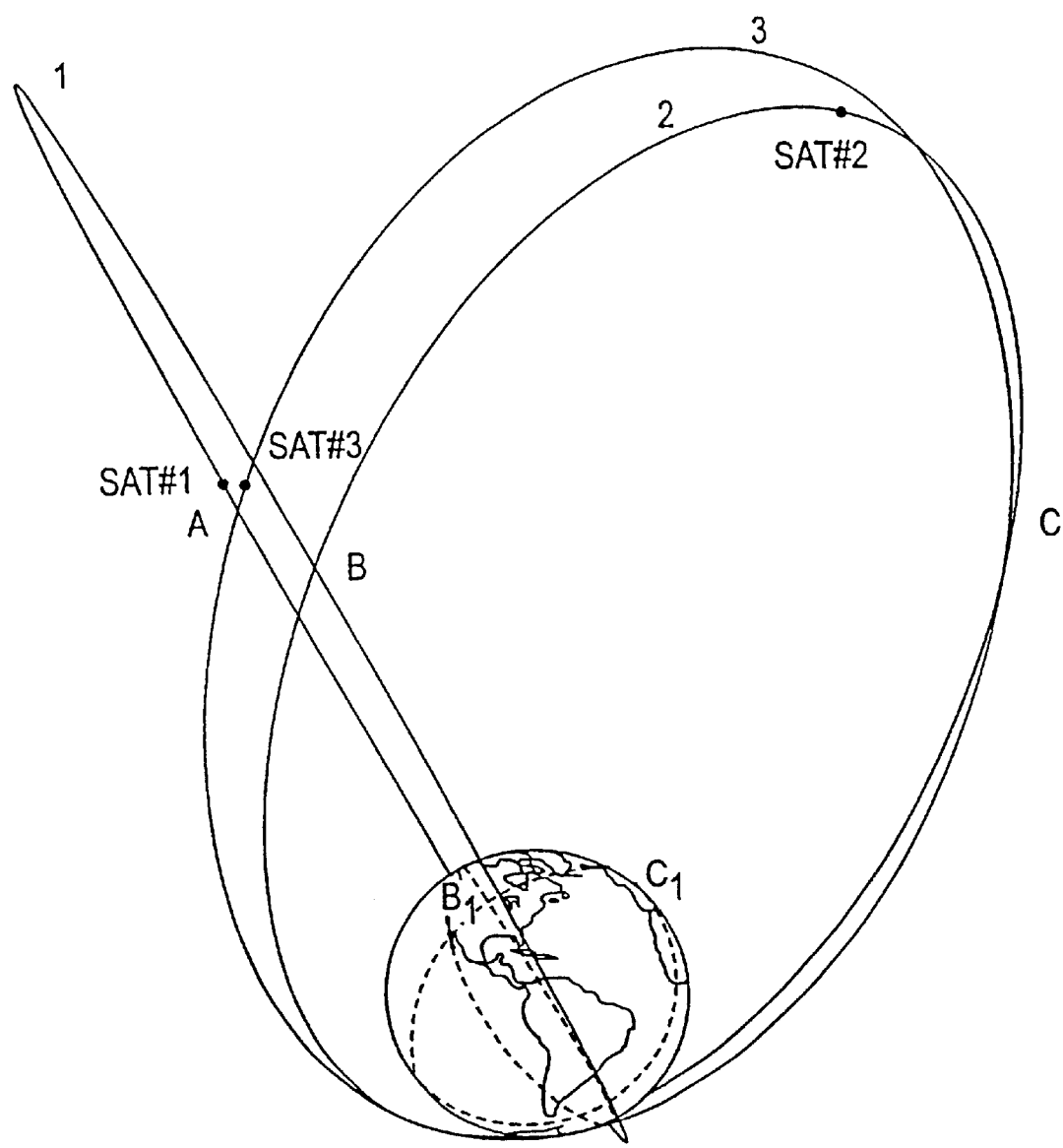
FIG. 3B illustrates a general orbital view of the three-satellite system, as seen from a point in space outside the orbit environment and at a latitude 5 degrees North.
Figure 4B:
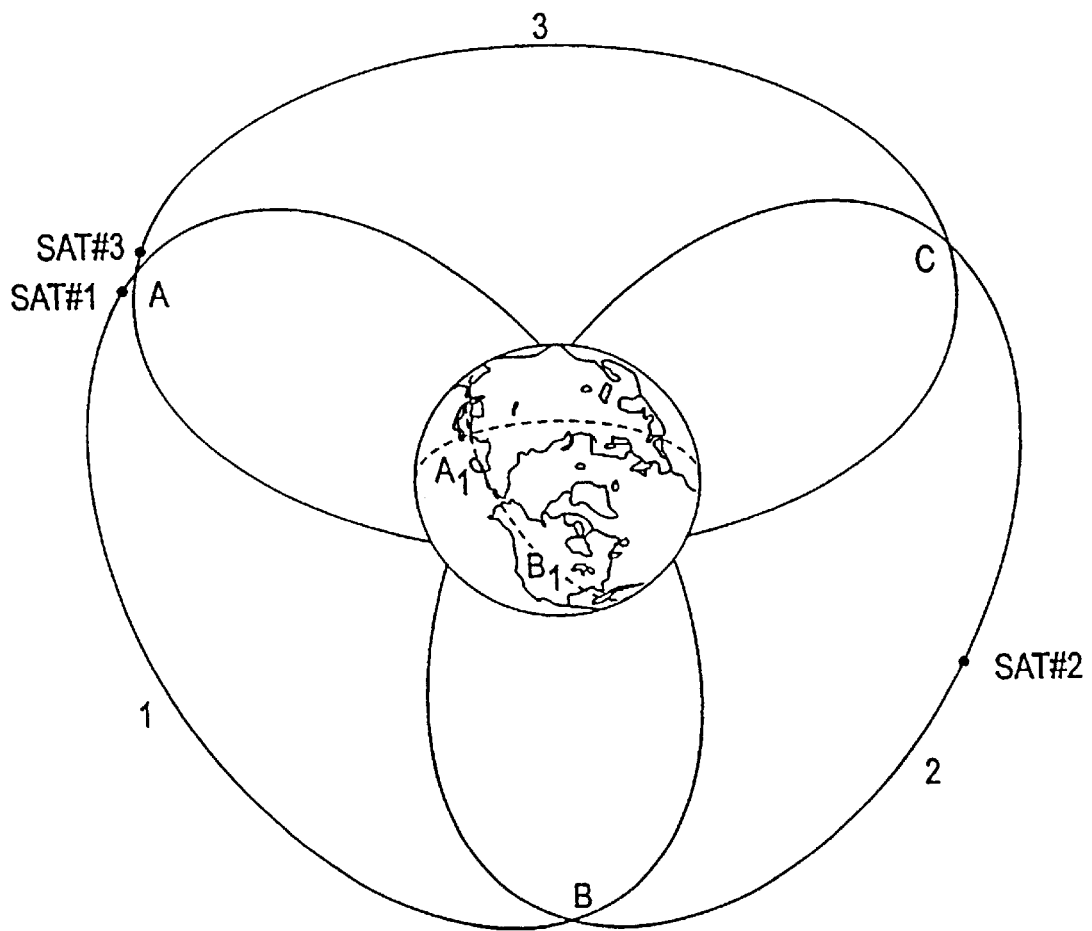
FIG. 4B shows a general orbital view of the three-satellite system, as seen from a point in space outside the orbit environment along the North side of the Earth axis.

Similar considerations, taking into account the different orbital geometry (FIG. 3B and FIG. 4B), applies to the 3-satellite system. The results are: 1) continuity of services in two geographical areas at opposite longitude, and 2) operational duty cycle for each satellite equal to ⅔, or ⁻66.6%. The feature, and consequent benefit, of the orbits described is that all along the operational arc each satellite appears nearly stationary with respect to any point on the ground. It is important to note that the actual angular width of satellite excursion along the loop, in the longitudinal direction, is less than ½ the value shown in FIG. 2A or 2B. The reason is that these figures show ground track longitude, but the true Earth centered angle at a given latitude is not equal to the longitudinal span. Instead, it is equal to this multiplied by the cosine of the latitude. Since the maximum longitudinal width of the loop occurs at a latitude slightly larger than 60 degrees, the multiplier is slightly less than 0.5.

The loop, as seen from the sub-orbital point, is slightly larger. The "enlargement factor" is approximately equal to the ratio r/h, where r and h are, respectively, instantaneous orbit radius and altitude. Since both r and h vary along the loop, the enlargement factor can only be computed on an average basis. Its value is slightly less than 1.2 at the sub-orbital point. The appearance of the loop from other sites on the ground is affected not only by the distance (range) from the satellite, but also by the location of the site. As the site gets closer to the satellite horizon, and the range increases, the overall amplitude of the loop, as seen from the ground, tends to become smaller (an effect also increased by perspective). The orientation of the loop in the sky changes with the location of the site relative to the sub-orbital point.

Figure 5A:
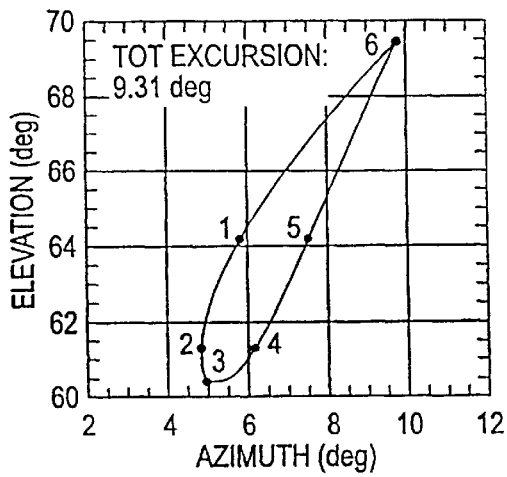
FIGS. 5A–5D show satellite visibility angles (azimuth and elevation) and ranges from sample ground sites on the continental USA, for the four-satellite system along the operational arc of the respective orbit.
Figure 5B:
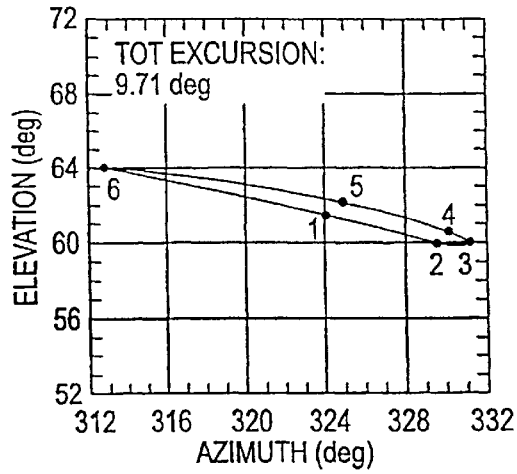
Figure 5C:
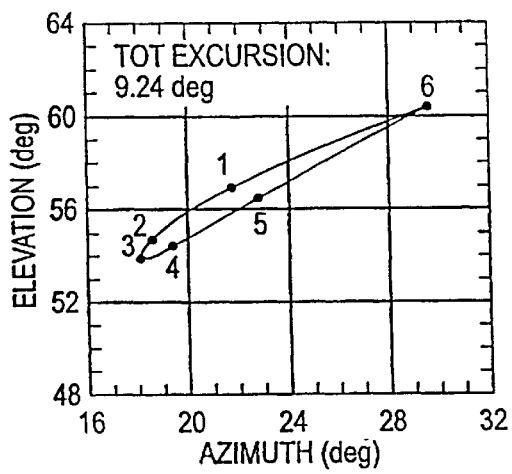
Figure 5D:
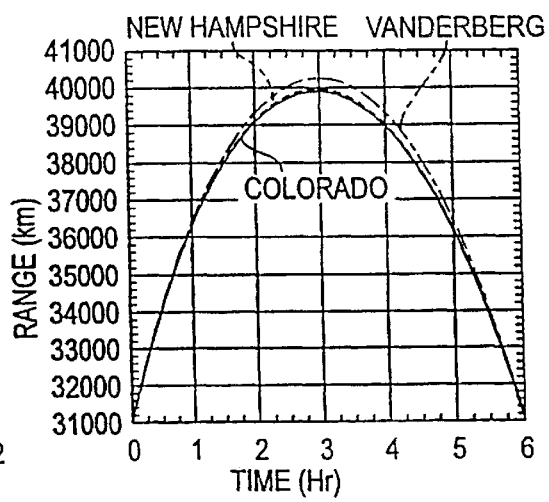

FIGS. 5A–5C show the orientation and size of the loop as seen from three sample sites, conveniently chosen to illustrate the appearance of the loop from points in the continental USA (CONUS). Range variations from the sites are also shown in FIG. 5D. Loop orientation and size are portrayed in detail, in terms of conventional azimuth and elevation angles. (Azimuth is the angle, measured clockwise in the site's local horizontal plane, from the North direction to the vertical plane through the satellite. Elevation is the angle between the satellite line of sight and the local horizontal plane.) The figure includes the total angular excursion, as seen from each site, in the elongated direction of the loop. The total angular excursion is close to the latitude excursion (FIG. 2A or 2B) multiplied by the enlargement factor. The larger excursion occurs at the New Hampshire station (FIG. 5B), because of its closer location to the satellite sub-orbital point. A smaller excursion occurs at Vandenberg, furthest from the sub-orbital point, as seen in FIG. 5C.

Figure 6A:
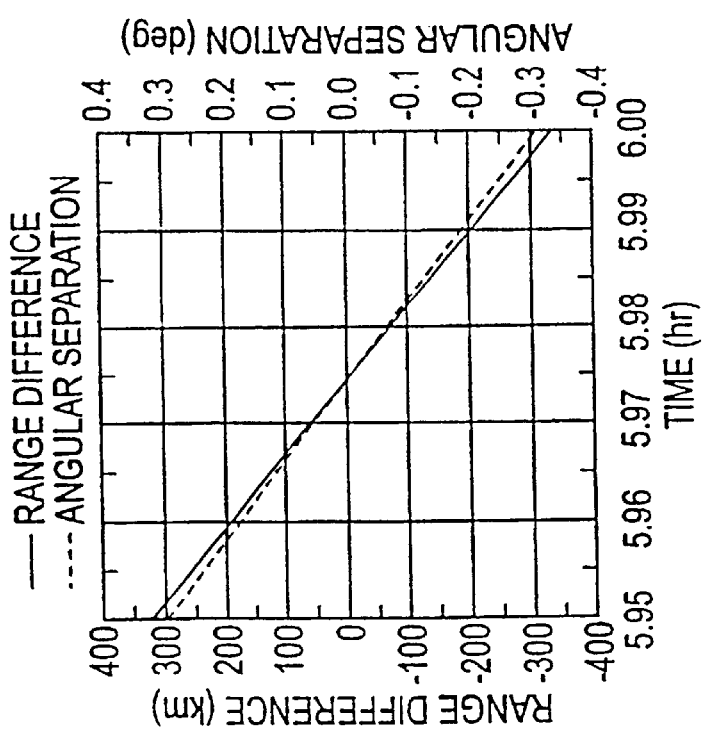
FIGS. 6A–6D show satellite range difference and angular separation during hand-over, as seen from different ground sites, in the four-satellite system.
Figure 6B:
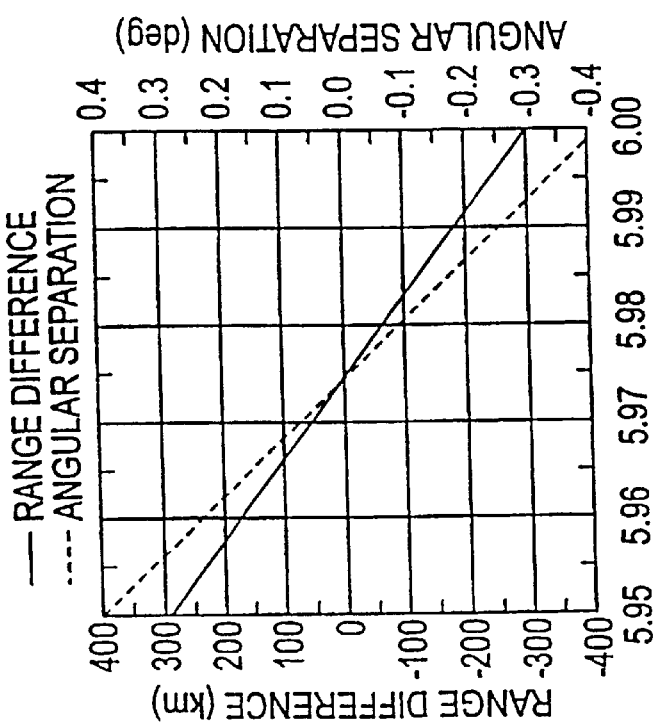
Figure 6D:
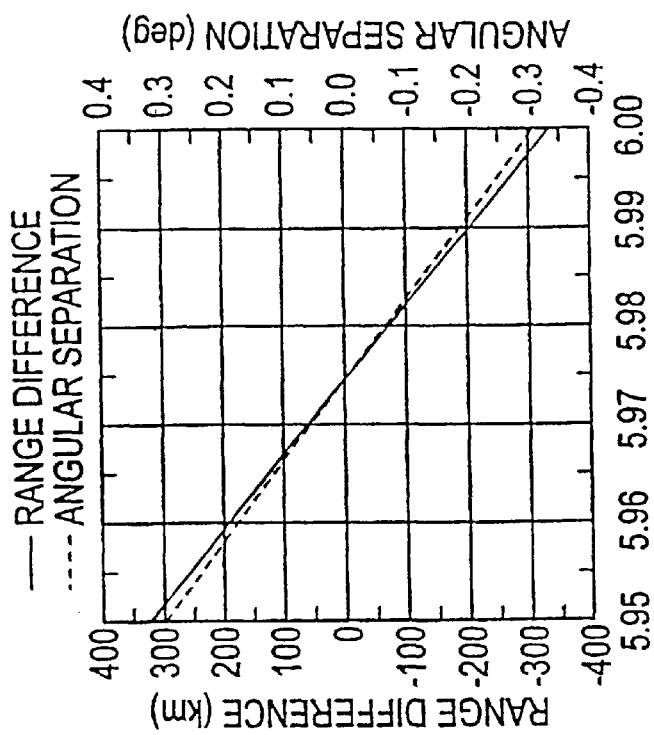
Figure 6C:
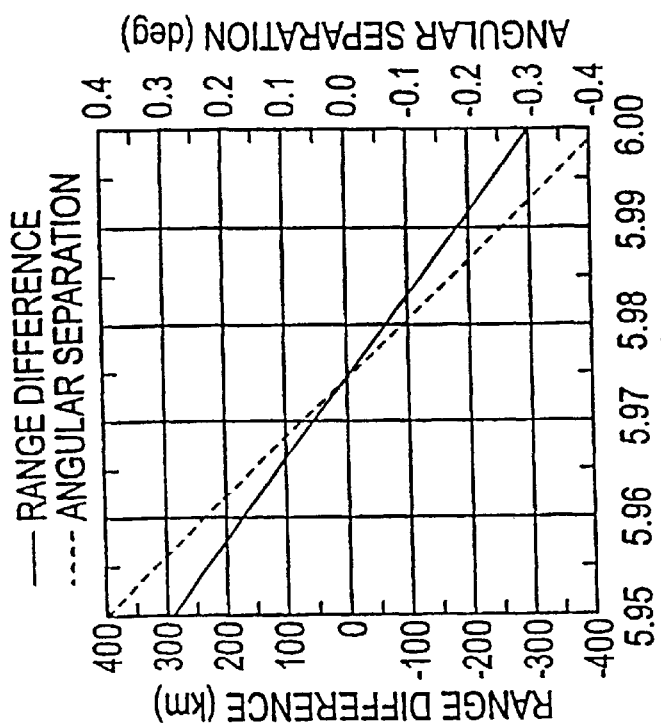

While site location affects the loop's orientation in the sky, it has little effect on the shape of the loop. This will appear straight from any ground site along the loop's average meridian, while from sites off the loop's meridian it will appear with a slight curvature. The curvature is close to that of the ideal loop in the sky (locus of the geographical positions of the satellite along the operational arc). FIGS. 6A–6B show (as functions of time for the 4-satellite constellation) range difference and angular separation between switching satellites (a satellite entering and a satellite exiting the loop) as seen from sample ground sites within the service region. The ground sites were chosen to represent extreme conditions, such as one close to the sub-orbital point and others toward the edge of the service area. It is noted that, during the hand-over interval the two satellites move in apparently opposite directions along the loop, the exiting satellite, which is furthest away from the earth moves downward, the incoming satellite, closest to the earth, moves upward. Thus the range difference and the separation angle are expected to decrease progressively and then increase during hand-over, as the figure shows. Optimum hand-over conditions occur around the zero crossing. In addition the time difference from the ground transmissions for the exiting satellite and the incoming satellite are such to favor the incoming satellite (i.e. the incoming satellite receives the ground transmissions ahead of the exiting satellite).

A major feature of the present invention is the method and apparatus for a transparent hand-over, as seen by the users of the system, from the satellite leaving the minor loop to the satellite entering the minor loop. The switching between satellites is accomplished independently of any satellite ground control station in one of two ways, both of which are part of the embodiment of this invention;

1. The switching of the entire satellite capacity at one time and when the satellites have minimum distance separation.

2. The switching of the individual (transponder) segments of the satellite communication subsystem, in which each segment is receiving transmission from geographically different locations, and therefore whose time for minimum range separation is different for each of the locations.

Figure 8:
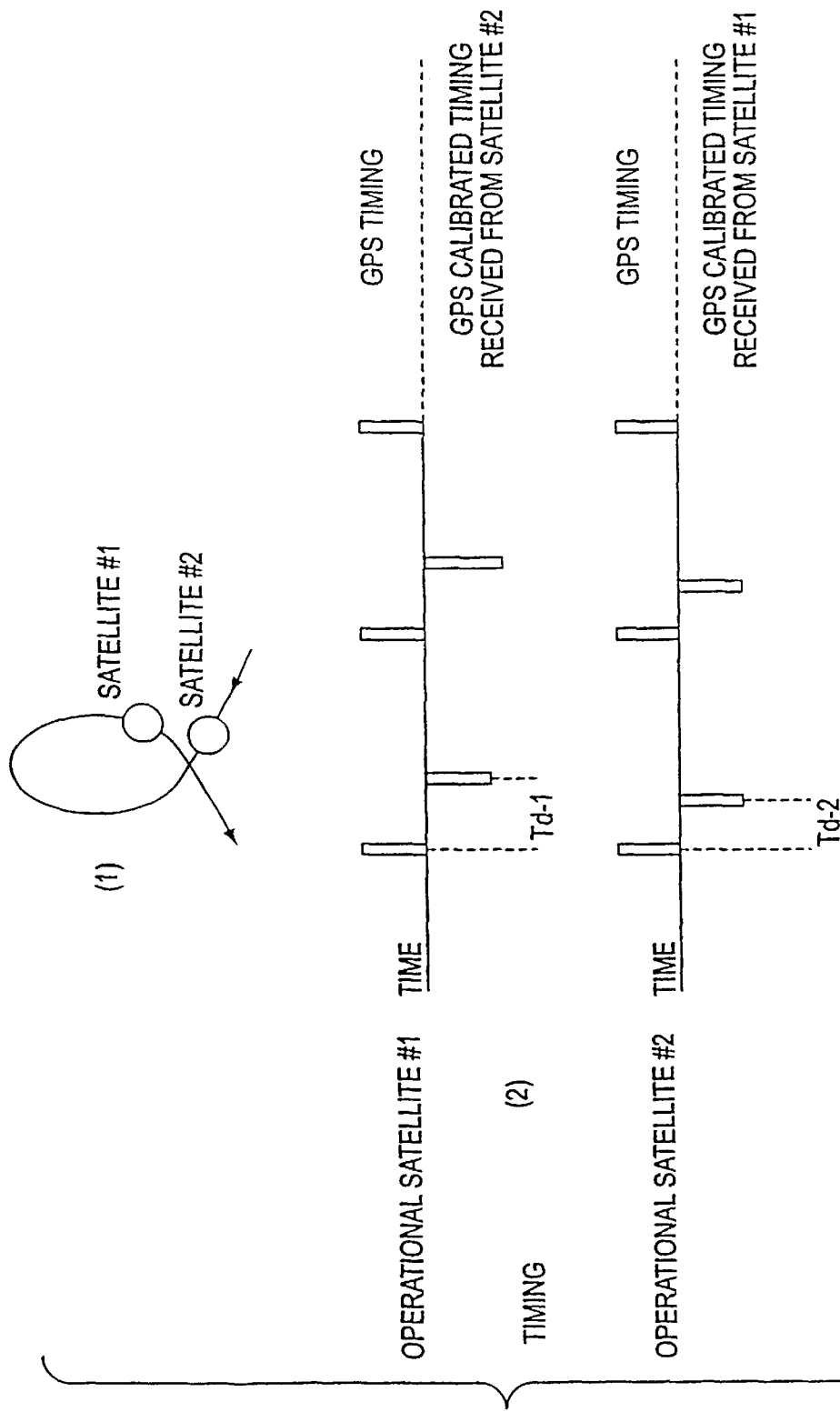
FIG. 8 shows the hand-over sequence, Method 1, between the operating satellite leaving the loop and the new satellite entering the loop.

Both methods of switching rely on (a) receiving accurate timing information from the GPS network, and (b) on accurate knowledge of the time delay, due to the separation distance between the two satellites. FIG. 8 is common to both methods of switching. For purposes of explanation, it is assumed that satellite #1 is presently in the minor loop 1 during its operational mode and is being replaced by satellite #2, which is entering the minor loop. The range difference occurring with time is shown with the time being determined on each satellite from the GPS network. When the difference in time between satellite #1 and satellite #2 is zero or a minimum, relative to GPS time, then the satellites are at their closest point with respect to each other. This time difference is known on each satellite by the transmission of calibrated timing information between the two satellites via a local telemetry link. Fixed time delays due to the local satellite transmit and receive equipment are calibrated out in the design of the hardware. It is important to note that the time of satellite #2 transmission is always in advance of transmission timing for satellite #1. This is due to the orbit structure in that satellite #2 is lower in altitude than satellite #1 and has the advantage that transmission received by satellite #2 are effectively ahead of the same transmissions received by satellite #1, therefore no information is lost in the hand-over providing it occurs before the crossover.

In switching method 1, as illustrated in FIG. 8, both satellites are receiving transmissions from the ground with satellite #2 transmitter being in the off position. When the timing information transmitted between the two satellites is minimized, or equal to zero, satellite #2 is commanded on and satellite #1 is commanded off. Both satellites are able to do this with negligible time delay since only the low power signal path in each satellite communication subsystem is actually switched.

Figure 9:
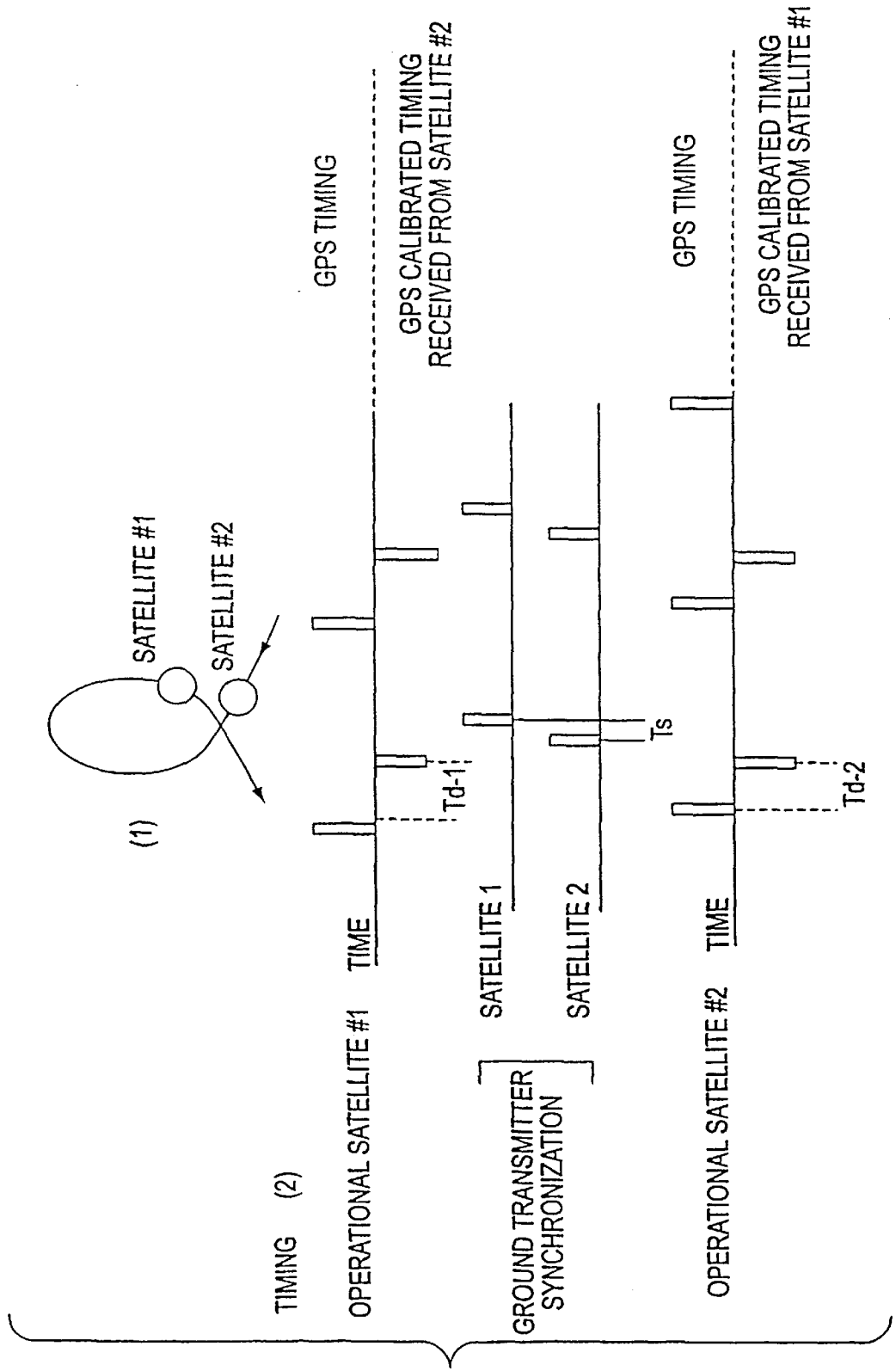
FIG. 9 shows the hand-over sequence, Method 2, between the operating satellite leaving the loop and the new satellite entering the loop.

Switching method 2, which follows the same principles as method 1 and is illustrated in FIG. 9, is required when communications switching between the two satellites has to be very precise for each of the individual transmit earth stations on the ground. In the case of method 1 switching is based on the GPS timing difference between the satellites being at a minimum or close to zero. Errors in switching timing occur due to the ground transmission being made from different geographical locations to each satellite. Communication transmissions reaching the two satellites from different geographical locations will be different in time depending upon the angular separation of the two satellites relative to that specific ground station. Typically switching time errors amount to less than 7 microseconds, but can be significantly reduced by individually switching each transmission from the different geographically separated ground stations at the satellite. Typical ground transmissions are digital and use a portion of the satellite communication payload referred to as a transponder. Therefore switching individual transponders can remove any errors that resulted from different geographical locations on earth. FIG. 9 illustrates switching method 2 and, as seen from the figure, each satellite receives the GPS timing from the other satellite. When the time difference (Td) is at its minimum, individual satellite transponders are commanded to switch at the next related ground synchronizing pulse. If the synchronizing pulses are .separated in time by a value greater than the difference in time of arrival from the common ground station, they will be the same synchronizing pulse. The precise timing of the ground transmitter synchronizing pulse is not an important parameter. With this method, the transfer of the communications from one satellite to another occurs at exactly the same point in the transmission signal with no loss of transmission data.

In an additional embodiment of this present invention the satellite antenna coverage areas must be controlled due to three factors.

1. When the satellite is operating in the loop, an altitude change of ⁻30,000 Km to ⁻40,000 Km (4-satellite constellation) occurs between the bottom of the loop and the top (FIGS. 2A, 2B). This change in altitude will result in the shape of the coverage area being changed. Specifically, when the satellite is at its highest altitude the satellite beam will provide the maximum coverage on the ground, when the satellite is at its lowest altitude, the beam coverage will be minimum.

2. Each individual satellite over a 12 hour period provides coverage to two different geographical locations located at the longitude of the minor loops 13A., 14A. as seen in FIG. 1C. This requires the satellite antenna coverage area be changed in order that optimum, or a market-driven, coverage can be provided at each location the satellite is intended to serve.

3. When the satellite is operating in the small loop it will be necessary to provide normal attitude control. However with the solar array pointing towards the sun and coupled to the spacecraft through a single connection point (gimbal) the antenna beam will rotate around the target-pointing axis. This rotation can be corrected by the phased array antenna, or by de-spinning the antenna platform.

Figure 10:
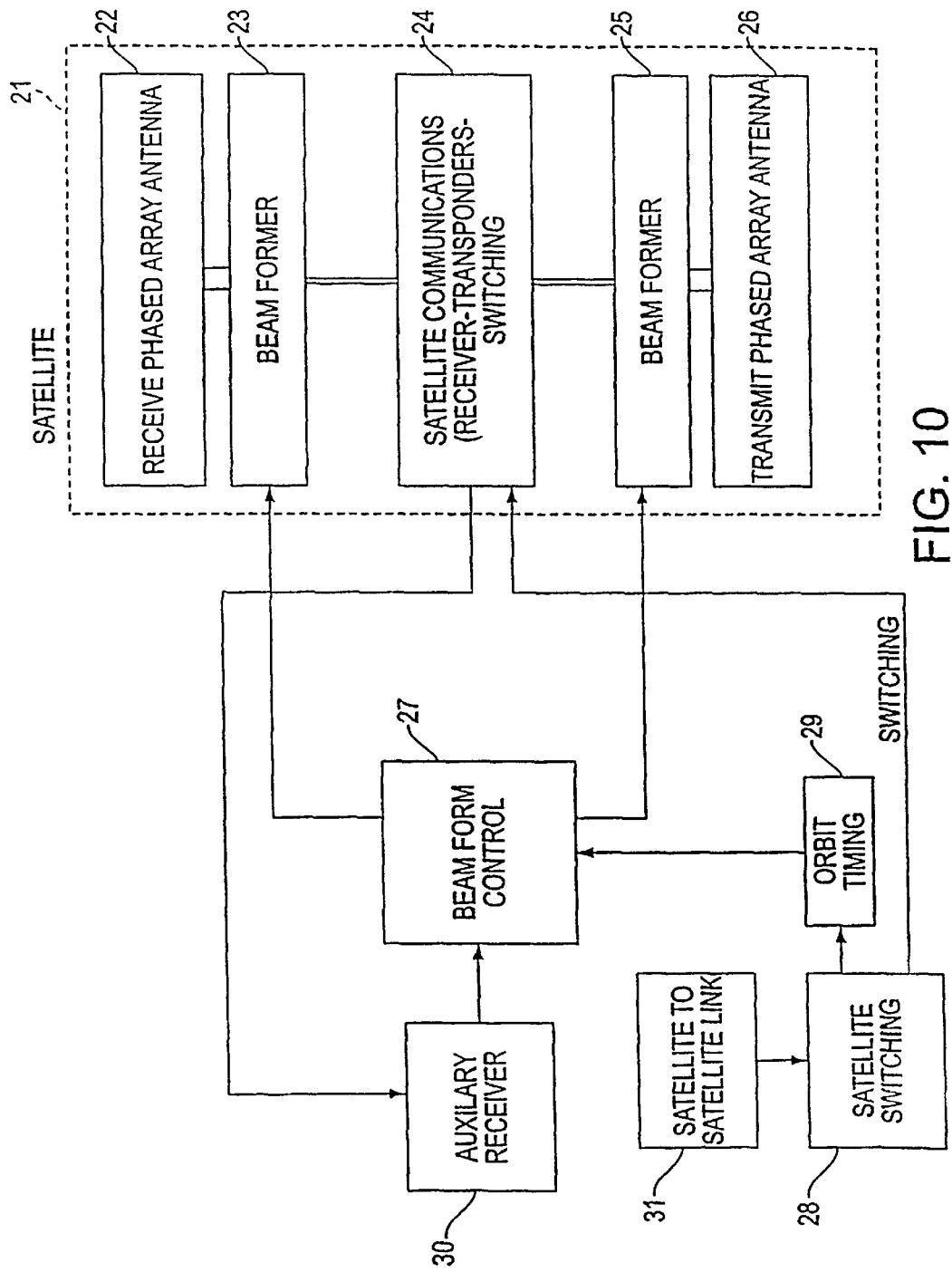
FIG. 10 shows in block diagram form the satellite communication switching and antenna control.

To meet these requirements, an adjustable phased array communication antenna will be used on the satellite, which is controlled in a variety of ways to achieve a desired beam coverage. Control of the satellite phased array antenna is accomplished either internally to each satellite or by ground command. Internal control of the antenna coverage area from within the satellite is required to cover repetitive and periodic changes during each orbit and within the loop. The ground command changes to the antenna coverage, which occur less frequently, are to modify the satellite antenna beam's coverage to adapt to market changes during the lifetime of the satellite. FIG. 10 illustrates structures relevant to this feature of the invention. A typical communication subsystem diagram for the satellite is shown as 21 and consists of the receive phased array antenna 22, low noise amplifiers (not shown), receive antenna beam former 23, combination of communication receiver, transponders and RF switching 24, transmit beam former 25 and transmit phased array 26. Control of both receive and transmit beam former 25 is provided by the Beam Former Control 27. Control of the antenna Beam Former is accomplished by conventional methods, namely applying appropriate voltages to the phasing diodes in the beam former thereby adjusting the phase of the RF signal to each element of the phased array resulting in the changing of the beam pattern. Consequently, the beam pattern changes as a result of adjustment in the phase of the RF signal to each element in the phased array. The beam former control 27 is operated from the satellite switching unit 28 and orbit timing unit 29. This applies the necessary signals to the beam former control as a function of where the satellite is in the loop, which is also directly related to the altitude adjustment. Major changes in the antenna beam shape to cover changes in satellite coverage are managed from a second beam former control 30. Information is received from the ground via the satellite communication telemetry and command channels to apply the necessary commands to the beam former control 27. The satellite to satellite link 31 is shown as part of the overall communications and control system, and is used for hand-off operations as previously discussed.

As in all communication satellite systems consideration has to be given to interference with satellites in the equatorial geostationary orbit operating on the same radio frequencies, as well as with terrestrial communication systems that also share the same radio frequency bands.

The interference between satellite systems of this invention and geostationary communication satellite systems (either their space or ground segments), or any element of the terrestrial microwave ground network, is tied to angular separation between the two different types of satellites.

Figure 7:
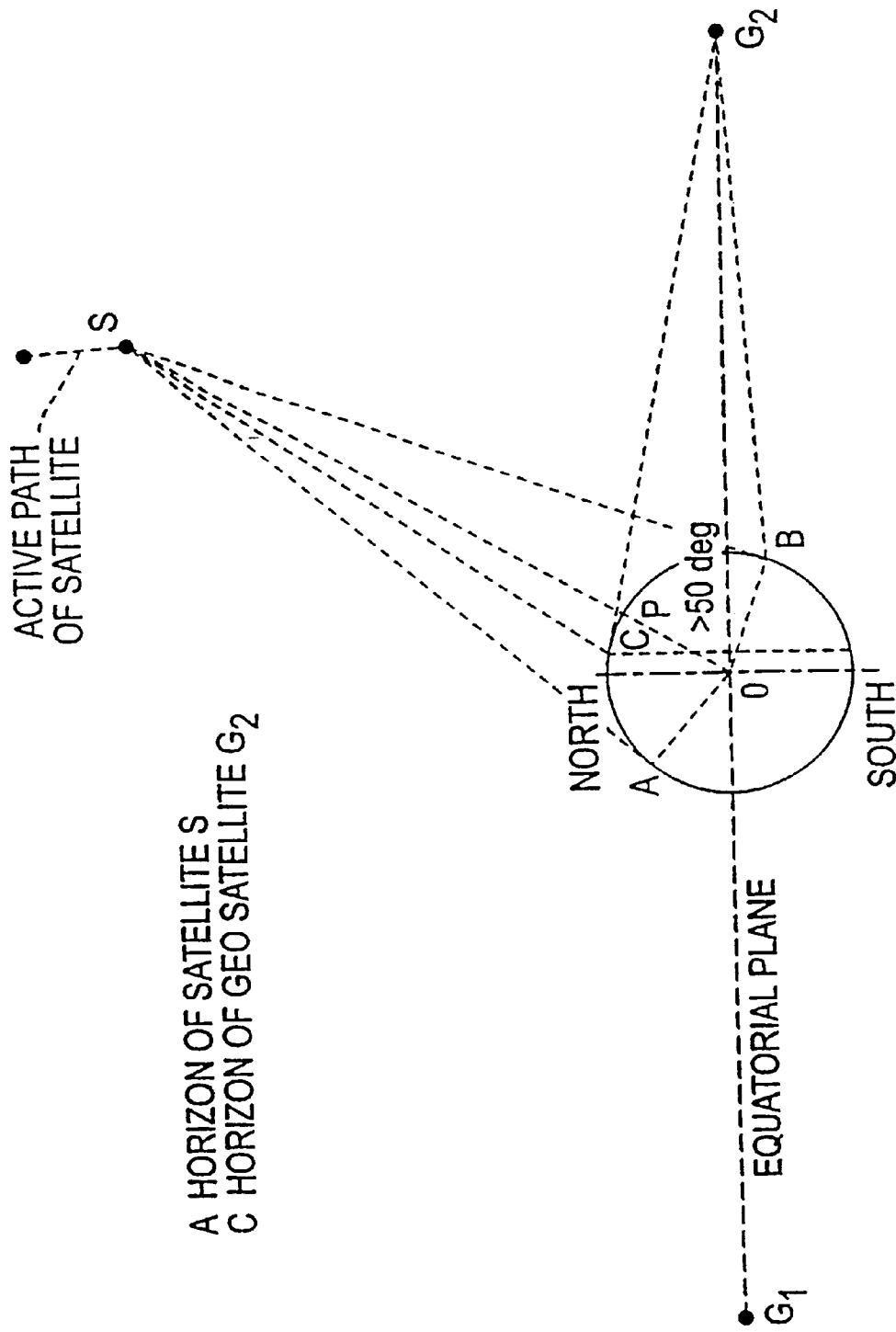
FIG. 7 illustrates the geometrical relationship between any one satellite of the system (three or four) and satellites in the geostationary satellite orbit.

The geometrical relationships between equatorial geostationary satellites and satellites of this invention is shown schematically in FIG. 7, where $G_1$ and $G_2$ are geostationary satellites, and S is one of the satellites of this invention. The latter is shown along its operational arc spanning a latitude range of ⁻54.5 to ⁻63.5 degrees (FIG. 2A) for the 4-satellite constellation and ⁻45 to ⁻63.5 degrees (FIG. 2B) for the 3-satellite constellation. During the operational phase, the satellite (S) aims its antenna beam to the service region below. Hence, the beam axis will nominally be aimed at the satellite's sub-orbital point P. Therefore, the minimum latitude of the satellite (greater than 45 degrees) also represents the minimum angular separation between the satellite's beam axis S-P and the equatorial plane (angle $S-O-G_2$).

The beam axis of any ground station transmitting to the satellite S will likewise have a minimum angular separation greater than 45 degrees from any visible satellite in the geostationary orbit. The minimum separation condition applies to ground transmitter antennas located on, or near, the horizon of equatorial geostationary satellites, (for example, point C of FIG. 7 relative to point $G_2$). Simple geometry shows that the angle $S-C-G_2$ assumes the minimum value of approximately 45 degrees (3-satellite constellation) or ⁻52.6 degrees (4-satellite constellation), when the satellite S is at its minimum altitude. Any other ground location, within the region of common visibility from both satellites S and $G_2$, will always have a larger angular separation. Likewise, it can be shown that at any ground receiver from any geostationary satellite the minimum angular separation from S is always greater than 45 degrees. At point B, which is on the horizon of S, the angle $S-B-G_2$ assumes the minimum value of 45 degrees (3-satellites) or ⁻55 degrees (4-satellites), when the satellite S is at its minimum altitude.

It has been shown, on the basis of simple geometry, that satellites in the orbit of this invention will operate with a minimum angular separation of at least 45 degrees for the 3-satellite constellation and 50 degrees for the 4-satellite constellation from any satellite operating in the equatorial geostationary orbit. With such separation angle, no interference occurs as long as the ground stations are operating with directive beams pointing at their respective satellites. This is the case for all present and future fixed satellite services, such as those used for point-to-point communications and television broadcasting services. It is not valid for satellite mobile communications services where non-directional (omni) antennas are used. These provide no discrimination from satellites having high angular separations. This invention is only applied to fixed satellite services.

As mentioned above for a typical 3-axis stabilized spacecraft, having a single gimbaled solar array, the satellite communication antenna beam will rotate around the target point axis, if the solar array is to be correctly pointed towards the sun via a single joint and no adjustments made to the phased array antenna. As an embodiment of this invention a method to remove this antenna beam rotation is included.

Removal of this rotation can be accomplished through the use of a de-spinning antenna platform with up to ±90 degrees of rotation.

Activation of the de-spun platform is only made during the operational portion of the orbit, or when the satellite is in the small operational loop.

Utilization of a de-spun platform containing the antenna and communications package within a 3-axis body spacecraft forms a part of this invention.

Satellite systems of this invention have unique elements that distinguish them from the equatorial geostationary satellite communication systems. Unlike the equatorial geostationary satellite systems, satellites of this invention use highly inclined and eccentric orbits. The combination of the orbital elements and the number of satellites in the system produce the following unique features:

1. By the specific selection of satellite orbital parameters and for a minimum number of satellites in the constellation (3 or 4), a method of establishing small operational locations of the satellites in either the northern or southern hemisphere is achieved. Satellites in these small operational locations (loops) appear nearly stationary as seen from any point on the ground within the coverage area of the satellite. The orbital elements have been accurately selected so as to minimize the size of the loop. For the four-satellite constellation, the loop spans approximately 9 degrees in latitude and 1 degree in longitude (corresponding to 0.5 degree in the east/west direction), with the loop location set at an approximate latitude of 60 degrees. All the satellites in the constellation (3 or 4) take turns in occupying the loop position and with the correct selection of orbital parameters a satellite exiting the loop will be located with the new satellite entering the loop for a period of time corresponding to several minutes 2. With the use of GPS, precise timing is established for transferring any type of communications service between the exiting satellite from the loop and the new satellite entering the loop. This transfer of communications is accomplished through establishing a direct communications link between the two satellite in order that each satellite through the use of GPS timing information understands its relative timing difference with respect to the other satellite. With the timing differences between the two satellites minimized communications services are transferred in their entirety from one satellite to the other without any interruption of service and completely autonomously (without requiring any commands or signals from the ground).

3. Using both the GPS and time reference points (synchronizing pulses) from transmitting ground stations, precise transfer of signals on a per-transponder basis can be achieved irrespective of the specific location of ground stations within the coverage area of the satellite.

4. High gain, narrow beam, ground-fixed antennas, or antennas with limited pointing in a single axis can be used for communications to satellites operating in the small loops.

5. The small operational loops (the minor loops) have at least a minimum angular separation from the geostationary equatorial plane of 45 degrees (3-satellite constellation) or 54 degrees (4-satellite constellation). This allows complete frequency spectrum sharing between the geostationary satellite systems and satellite systems of this invention, without the use of any interference mitigating techniques.

6. Satellites in the constellation using the foregoing orbital parameters, can make adjustments to their antenna coverage beams when located out of the operational loops while communications services are terminated, via on board computer controlled phased arrays and not requiring the use of any ground intervention. These antenna coverage changes are required to optimize the satellite communication coverage for each of its operational loops 7. Each antenna coverage pattern can be changed during the life time of the satellite by intervention of ground commands to the satellite, which modify the computer software and therefore the satellite antenna coverage patterns, for either or both operational loop locations.

8. Satellites in orbits of this invention using 3-axis stabilization and single gimbaled solar arrays have the need to remove any rotation of the satellite antenna beam around the target point in order to avoid the rotation of the beam during the operational period in the loop. As a part of this invention this corrective measure is accomplished either through the use of a de-spun antenna and/or a de-spun communication-antenna platform within the body of the 3-axis spacecraft or by correcting the beam pattern rotation by adjusting the phased array.

While the present invention has been described with regard to certain preferred embodiments, the invention is not intended to be limited thereto, and the full scope of the invention is intended to be defined solely by the appended claims.

What is claimed is:

1. A high latitude communications satellite system providing continuous regional communication services comprising:

a plurality of satellites disposed to move in respective elliptical orbits, each said orbit being defined by an identical inclination value and defining from a terrestrial observation point a first pair of loops comprising a first minor loop and a first major loop disposed at a first longitudinal position, and a second pair of loops comprising a second minor loop and second major loop disposed at a second longitudinal position, said first pair of loops being separated from said corresponding second pair of loops by 180° longitude, and being at the same latitude positions, and both said first pair of loops and said second pair of loops being wholly disposed in one of the northern and southern hemispheres at a minimum angular separation from geostationary orbit of not less than 45°, and wherein said orbit has an eccentricity selected to minimize longitudinal and latitudinal excursions of the ground track in the minor loops, serving as an operational portion of the satellites orbit, and to provide co-location of at least two satellites proximate a predetermined location of at least one minor loop; and a plurality of ground-based, directive tracking and non-tracking narrow beam antennas, each operative to provide pointing to and communications with each of said satellites while each of said satellites is in a portion of at least one of the first or second minor loops.

2. The communication satellite system of claim 1 wherein said plurality comprises 4 satellites, each having an orbit duration of approximately 12 hours.

3. The communication satellite system of claim 2 wherein said loop spans approximately 9 degrees latitude and approximately 1 degree longitude.

4. The communication satellite system of claim 1 wherein a first satellite which is exiting one of said minor loops will be substantially co-located with a second satellite which is concurrently entering said one minor loop.

5. The communication satellite system of claim 4 wherein said first satellite exiting said minor loop has been in communication with one of said ground-based antennas during at least a portion of time said first satellite is in said minor loop, and said satellite entering said minor loop will be in communication with said same ground-based antenna.

6. The communication satellite system of claim 1 wherein each said orbit has a semi-major axis of approximately 26450 km, an inclination of approximately 63.4° and the right ascension of the ascending node (RAAN) is equally spaced around the equator.

7. The communication satellite system of claim 1 wherein said system comprises 4 satellites and said orbit has an eccentricity of 0.7237.

8. The communication satellite system of claim 1 wherein said system comprises 3 satellites and said orbit has an eccentricity of 0.7137.

9. The communication satellite system of claim 1 wherein said plurality comprises 3 satellites, each having an orbit duration of approximately 12 hours.

10. The communication satellite system of claim 9 wherein said first and second minor loops spans approximately 18.4 degrees of latitude and 2.02 degree of longitude.

11. The communication satellite system of claim 1 wherein each said satellite comprises an inter-satellite link apparatus for communicating timing information between pairs of said satellites when they are proximate as they move along their respective orbits.

12. The communication satellite system of claim 11 further comprising a GPS system-based source of GPS timing information, wherein each said satellite comprises GPS link apparatus for receiving GPS timing information from said GPS system-based source.

13. The communication satellite system of claim 12 wherein said link apparatus establishes a timing communication between proximate satellites prior to becoming co-located at said minor loop.

14. A high latitude communications satellite system comprising:
- a plurality of satellites disposed to move in respective elliptical orbits, each said orbit being defined by an identical inclination value and defining from a terrestrial observation point a first pair of loops comprising a first minor loop and a first major loop disposed at a first longitudinal position, and a second pair of loops comprising a second minor loop and second major loop disposed at a second longitudinal position, said first pair of loops being separated from said corresponding second pair of loops by 180° longitude, and being at the same latitude positions, and both said first pair of loops and said second pair of loops being wholly disposed in one of the northern and southern hemispheres at a minimum angular separation from geostationary orbit of not less than 45°; and
- a plurality of ground-based, directive, tracking and non-tracking narrow beam antennas, each operative to provide pointing to and communications with each of said satellites while each of said satellites is in a portion of the first or second minor loops;
- wherein a first satellite which is exiting one of said minor loops will be substantially co-located with a second satellite which is concurrently entering said one minor loop,
    - wherein said first satellite exiting said minor loop has been in communication with at least one of said ground-based antennas during at least a portion of time said first satellite is in said minor loop, and said satellite entering said minor loop will be in communication with said same at least one ground-based antenna, and
    - wherein communication from said first satellite to said ground antennas station is transferred to said second satellite, the timing of said transfer being established on board said satellites using timing provided directly to said first and second satellites by a GPS satellite in a constellation of GPS satellites.

15. The communication satellite system of claim 14 wherein said transfer of communications is accomplished by a direct communications link between said first and said second satellites.

16. The communication satellite system of claim 15 wherein said transfer of communications is accomplished using at least one of GPS and time reference pulses from transmitting ground stations.

17. The communication satellite system of claim 5 wherein timing differences between transmissions from said satellites are minimized.

18. The communication satellite system of claim 5 wherein said transfer occurs without any commands or controls from the ground.

19. The satellite system of claim 14, wherein said orbit has an eccentricity selected to minimize longitudinal and latitudinal excursions of the ground track in the minor loops, serving as an operational portion of the satellites orbit, and provide co-location of at least two satellites proximate a predetermined location of at least one minor loop.

20. A high latitude communications satellite system comprising:
- a plurality of satellites disposed to move in respective elliptical orbits, each said orbit being defined by an identical inclination value and defining from a terrestrial observation point a first pair of loops comprising a first minor loop and a first major loop disposed at a first longitudinal position, and a second pair of loops comprising a second minor loop and second major loop disposed at a second longitudinal position, said first pair of loops being separated from said corresponding second pair of loops by 180° longitude, and being at the same latitude positions, and both said first pair of loops and said second pair of loops being wholly disposed in one of the northern and southern hemispheres at a minimum angular separation from geostationary orbit of not less than 45°; and
- a plurality of ground-based, directive, tracking and non-tracking narrow beam antennas, each operative to provide pointing to and communications with each of said satellites while each of said satellites is in a portion of the first or second minor loops;
- wherein each of said plurality of satellites comprises a phased array antenna operative to change said satellite's overall beam pattern in response to commands based on the location of said satellite in orbit.

21. The communication satellite system of claim 20 wherein said beam pattern is switched automatically, based on preprogrammed on board satellite control, while said satellite is outside of said minor loops.

22. The satellite system of claim 20, wherein said orbit has an eccentricity selected to minimize longitudinal and latitudinal excursions of the ground track in the minor loops, serving as an operational portion of the satellites orbit, and to provide co-location of at least two satellites proximate a predetermined location of at least one minor loop.

23. A high latitude communications satellite system comprising:
- a plurality of satellites disposed to move in respective elliptical orbits, each said orbit being defined by an identical inclination value and defining from a terrestrial observation point a first pair of loops comprising a first minor loop and a first major loop disposed at a first longitudinal position, and a second pair of loops comprising a second minor loop and second major loop disposed at a second longitudinal position, said first pair of loops being separated from said corresponding second pair of loops by 180° longitude, and being at the same latitude positions, and both said first pair of loops and said second pair of loops being wholly disposed in one of the northern and southern hemispheres at a minimum angular separation from geostationary orbit of not less than 45°;and
- a plurality of ground-based, directive, tracking and non-tracking narrow beam antennas, each operative to provide pointing to and communications with each of said satellites while each of said satellites is in a portion of the first or second minor loops;
- wherein said satellites comprise 3-axis stabilized mechanisms and single gimbaled solar arrays, further comprising:
    - means for removing the rotation of the satellite antenna about the target point in order to avoid rotation of the beam during the operational period while said satellite is in said minor loop.

24. The communication satellite system of claim 23 wherein said 3-axis stabilized mechanisms comprise a de-spun antenna means within said spacecraft body.

25. The satellite system of claim 23, wherein said orbit has an eccentricity selected to minimize longitudinal and latitudinal excursions of the ground track in the minor loops, serving as an operational portion of the satellites orbit, and to provide co-location of at least two satellites proximate a predetermined location of at least one minor loop.

26. A method of switching active communication links from a first one to a second one of a plurality of satellites disposed to move in respective orbits defined in separate planes, all of said orbits having a common inclination and defining to a terrestrial observer at a ground-based antenna location a common pair of apparent loops, comprising a minor loop and a major loop, said minor loop being defined between a maximum latitude of approximately 63.4° and a minimum latitude of greater than approximately 45° and at a predetermined angular separation from geostationary orbit, said communication links being defined between said satellites and a plurality of ground-based antenna operative to communicate with said satellites while they are in said minor loop, comprising:

a) detecting and storing at each of said first and second satellites GPS timing information:

b) transmitting from each of said first and second satellites and receiving at said second and first satellites, respective GPS timing information via an inter-satellite link when they are proximate within their elliptical orbit:

c) detecting when the time difference between said GPS signals is a minimum:

d) responsive to said time difference detecting step, commanding the activation of an inactive one of said satellite communication transmitters and the inactivation of a corresponding active one of said satellite communication transmitters, whereby switching of at least one active communication link from an active transponder on a first satellite to an activated transponder on a second satellites is obtained.

27. The communication satellite method of claim 26 further comprising:

receiving from the ground a synchronizing pulse at each said satellites, and if at the time the synchronizing pulses are separated in time by a value greater than the difference in time of arrival from a common ground station ground-based source of GPS timing information.

28. The communication satellite method of claim 26 wherein the commanding the activation of an inactive one of said satellite communication transmitters does not occur beyond a loop cross over point after said satellite enters said minor loop.

29. The communication satellite method of claim 26 wherein the commanding the activation of an inactive one of said satellite communication transmitters occurs at a minimum range and angular separation as viewed from the ground between the inactive satellite and the active satellite.

* * * * *